Patented June 5, 1923.

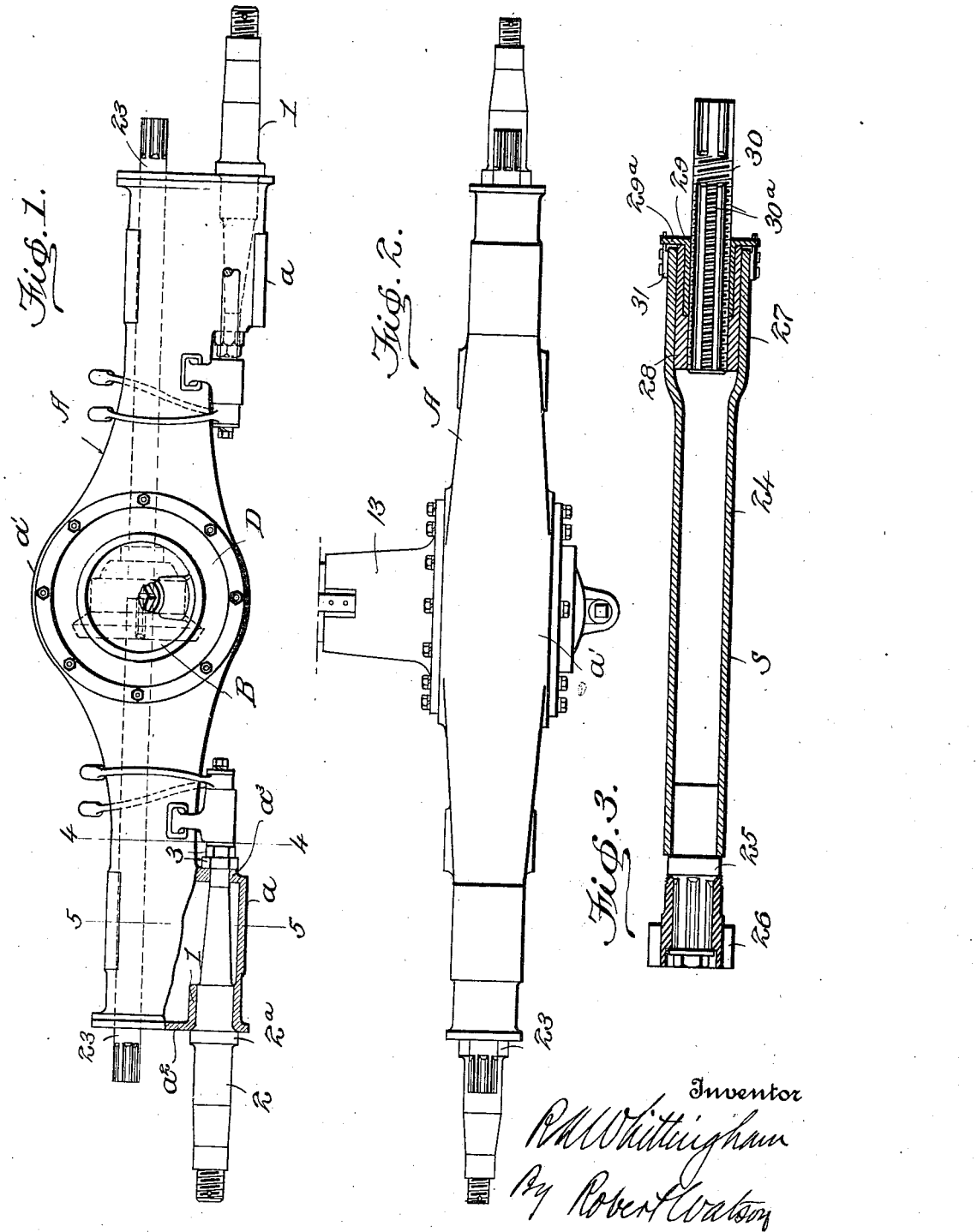

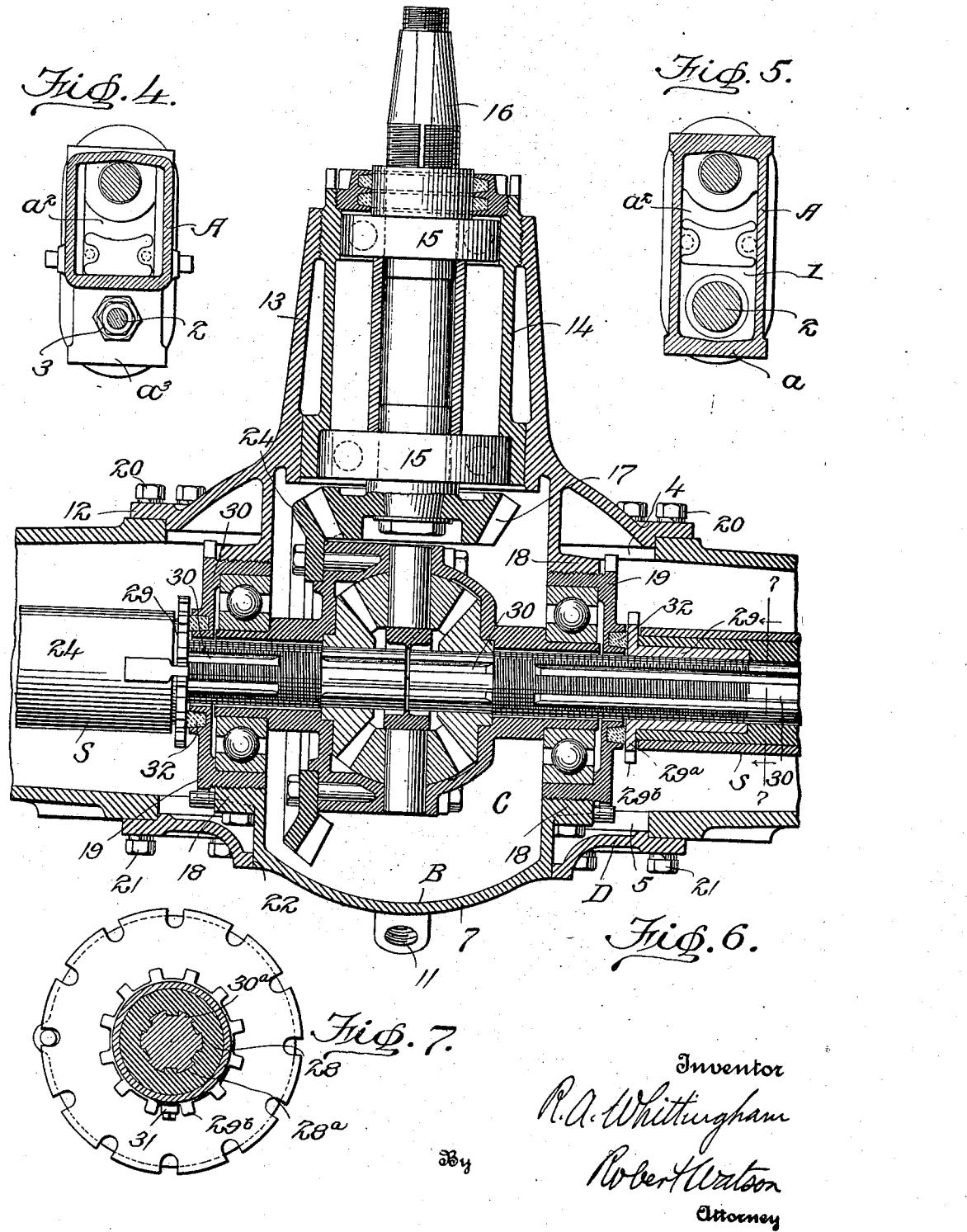

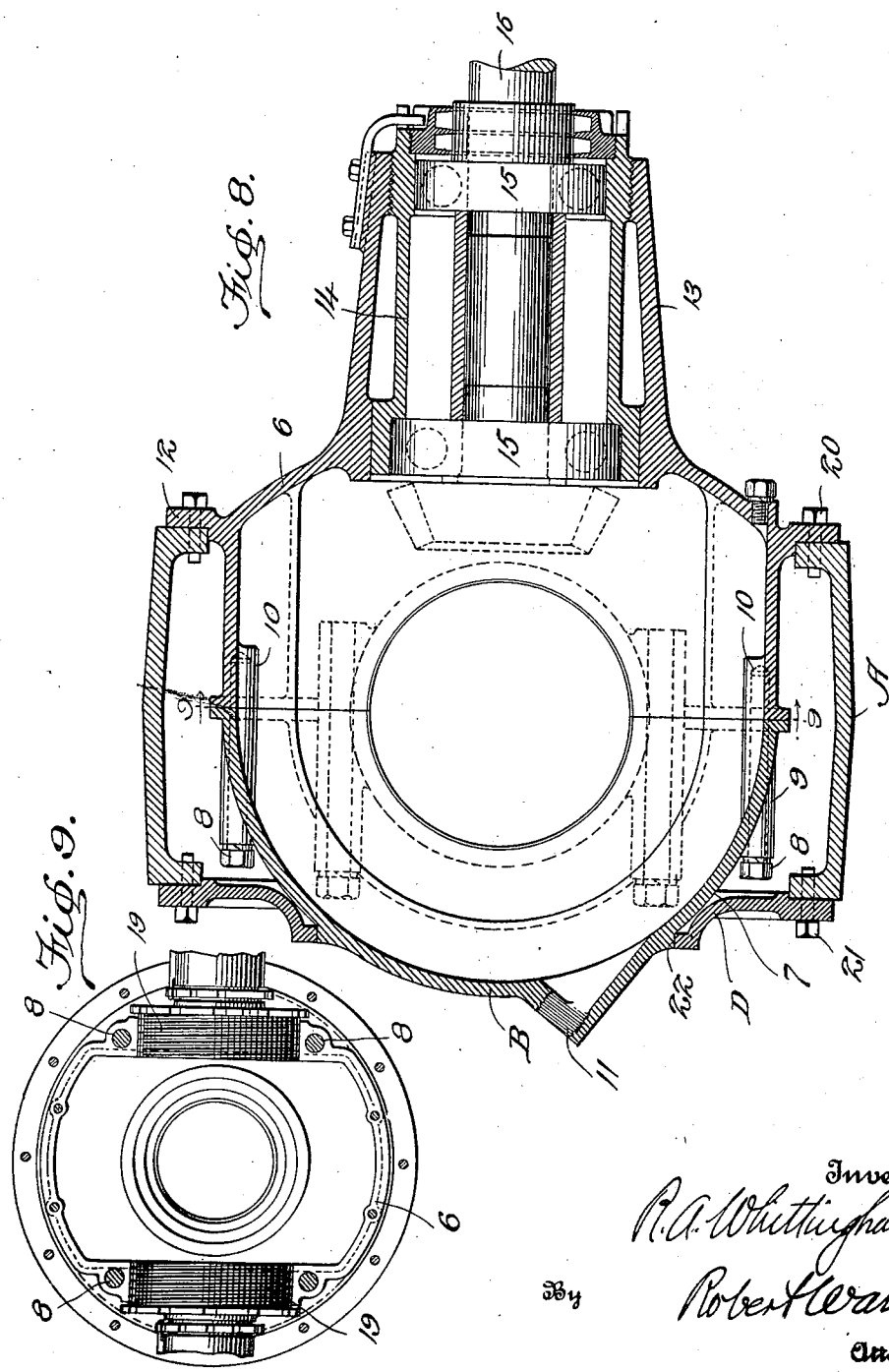

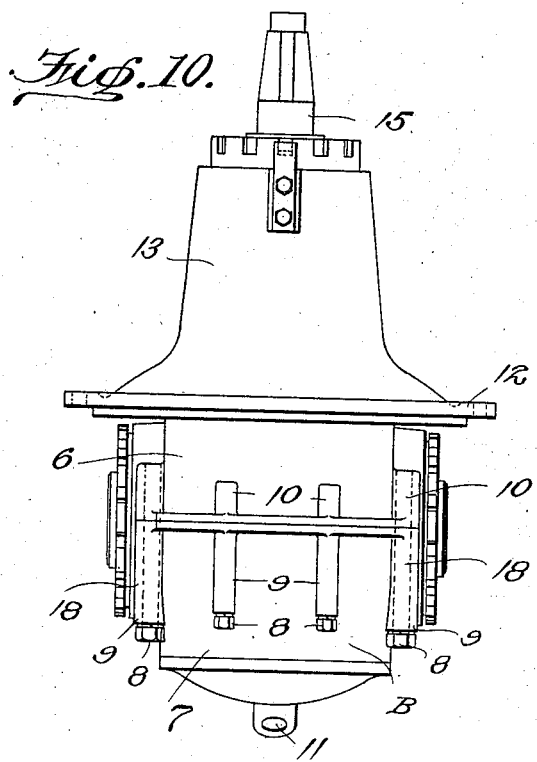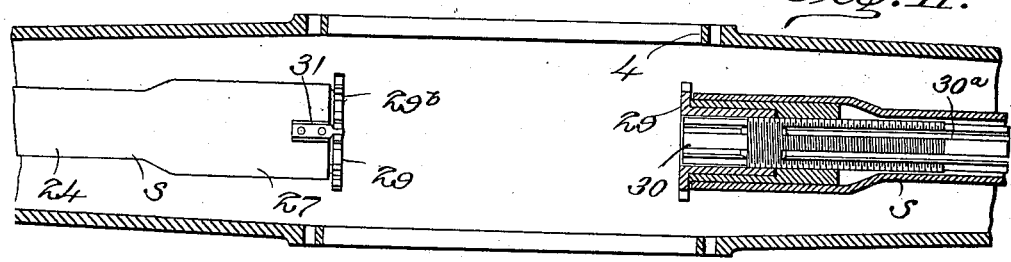

1,457,682

UNITED STATES PATENT OFFICE.

RICHARD A. WHITTINGHAM, OF NEWARK, DELAWARE, ASSIGNOR TO ATLAS AXLE COMPANY, OF WILMINGTON, DELAWARE, A CORPORATION OF DELAWARE.

MOTOR-TRUCK AXLE.

Application filed November 5, 1919, Serial No. 335,917. Renewed January 27, 1923.

*To all whom it may concern:*

Be it known that I, RICHARD A. WHITTINGHAM, a citizen of the United States, residing at Newark, in the county of New Castle and State of Delaware, have invented certain new and useful Improvements in Motor-Truck Axles, of which the following is a specification.

One object of this invention is to provide a rear axle for motor driven trucks which will be strong and durable and which will have a high clearance over the roadway; another object is to provide means whereby the working parts of the differential mechanism will be readily accessible for inspection and adjustment, and whereby said machanism may be readily assembled in the axle or removed for inspection and repairs; another object is to provide a rear axle construction wherein the driving shafts will be entirely enclosed within the axle housing which supports the load. The invention also comprises other features of construction which will be clear from the following specification, taken in connection with the accompanying drawing, in which, Fig. 1 is a rear elevation of a truck axle, embodying my improvements;

Fig. 2 is a top plan view of the same;

Fig. 3 is a longitudinal section through one of the drive shafts;

Fig. 4 is a section through the axle housing on the line 4—4 of Fig. 1;

Fig. 5 is a similar section on the line 5—5 of Fig. 1;

Fig. 6 is a horizontal section through the central portion of the axle;

Fig. 7 is a section on the line 7—7 of Fig. 6;

Fig. 8 is a central, vertical section through the axle housing and differential casing;

Fig. 9 is a section on the line 9—9 of Fig. 8, showing also portions of the drive-shafts, and their bearings, in elevation;

Fig. 10 is a top plan view of the casing enclosing the differential assembly, detached from the axle housing;

Fig. 11 is a horizontal section through the central part of the axle housing, showing the telescopic sections of the drive shafts telescoped to permit the entrance of the differential casing; and, Fig. 12 is a central section through the ring which forms a closure for the rear opening in the housing and supports the rear end of the casing.

Referring to Figs. 1, 2, 4, and 5, of the drawing, A indicates the axle housing which is in the form of a box girder, rectangular in cross-section, and having depending portions $a$ at its ends. The central portion $a'$ of the housing is enlarged vertically, as shown in Fig. 1, and widened, as shown in Fig. 2, to provide room for the differential assembly which is contained in a casing B, removably secured within the axle housing, as hereinafter described. The axle housing is provided with end walls, one of which is shown at $a^2$, in Fig. 1, and the depending portions of the housing having vertical walls $a^3$, spaced from the walls $a^2$. Tubular bosses 1 project inwardly from the end walls $a^2$, and the wheel spindles 2 extend through said bosses and through openings in the walls $a^3$ and are secured by lock nuts 3, threaded on to the inner ends of the spindles and bearing against the walls $a^3$. The spindles are formed with collars $2^a$, which abut against the end walls $a^2$ when the spindles are drawn tightly into place by the lock nuts.

Circular openings 4 and 5 are provided in the front and rear walls of the axle housing to permit of the insertion and removal of the casing B, which contains the differential assembly C (Fig. 6). This casing comprises two parts 6 and 7, of smaller diameter than the openings 4 and 5 in the axle housing and adapted to pass into the housing through one of said openings. These parts are secured together by cap screws 8, which extend through long threaded sleeves 9 on the part 7 and into threaded sockets 10 on the part 6.

The rear end of the part 7 has a filling opening 11, through which oil may be poured into the casing. The casing is provided with a flange 12, projecting from the forward end of the part 6, and in advance of said flange the casing has a tubular extension 13, which serves to enclose the sleeve 14 which carries the bearings 15 for the shaft 16. This shaft, which is operated in the usual way, through a universal joint, from the propeller shaft of the engine, not shown, is provided with a pinion 17, within the differential casing for operating the differential assembly. The parts 6 and 7 of the casing are formed with bosses 18, on opposite sides of the casing, and these bosses are internally threaded to receive the adjustable sleeves 19, which carry the bearings in which the differential assembly C is mounted. The differential assembly shown is of a well known form and does not require detailed description. As these bosses are split centrally, at the joint between the parts 6 and 7, it will be seen that by taking out the bolts 8, the bearings and the differential assembly can be inspected, or removed, if the drive shafts are withdrawn from the assembly. The differential casing when inserted in the axle housing, as shown in Fig. 6, is supported by cap screws 20, which pass through the flange 12 into the front wall of the axle housing, and by a ring D which is secured by cap screws 21 to the rear wall of the axle housing and which closely surrounds an annular shoulder 22 on the rear portion of the part 7 of the casing. When the casing is secured in place, the opening in the front wall of the axle housing is closed by the flange 12, and the opening in the rear wall of said housing is closed by the supporting ring D. The drive shafts, from the differential mechanism to the traction wheels of the vehicle, may be solid shafts, such as indicated at 23 in Fig. 1, and provided as usual with splines or angular parts at their inner ends for engaging the beveled pinions in the differential assembly. It will be obvious that when the solid shafts are used, these shafts will have to be pulled endwise out of the way of the differential casing before the latter can be inserted into or removed from the axle housing. In order to give this endwise movement to a drive shaft, the wheel, which it drives, in some makes of trucks, must be removed from the axle. The solid axle will ordinarily be used for heavy trucks, and also for the lighter trucks in situations where the repairs can be attended to in well equipped shops where the work of removing and replacing the wheels is not difficult. But in order to obviate the necessity of removing the wheels, to remove or replace the differential mechanism, I have provided drive shafts, each in two telescopic parts, so that the inner end portions of the shafts may be moved into or out of the differential casing without requiring endwise movements of the portions of the shafts which are geared to the traction wheels.

The drive shaft having two telescopic parts may be constructed in various ways, the essential feature being that the part which engages the pinions in the differential assembly shall be movable relatively to the other part far enough to clear the differential casing.

Referring to Figs. 3, 6, 7, and 11, of the drawing, S indicates a drive shaft composed, as shown in the drawing, of a tube 24, in which is secured at one end a short solid rod 25, splined to engage the driving pinion 26, the opposite end of the tube being enlarged as shown at 27. Within this enlarged end of the tube is secured a bushing 28. This bushing which is preferably welded to the tube, has internal grooves $28^a$ on its inner half, and it is recessed in its outer half to receive a rotatable sleeve 29. An adjustable shaft section 30 fits within the bushing and is provided with splines $30^a$ which fit within the grooves $28^a$ in the bushing, and the shaft section also has external threads which are engaged by internal threads on the sleeve 29. The arrangement is such that the rotation of the sleeve 29 will cause the shaft section 30 to move longitudinally with respect to the main portion of the shaft. The sleeve 29 has an outwardly turned flange $29^a$, provided with a series of projections $29^b$, and a detent 31, secured to the tubular portion of the shaft is adapted to fit between the projections and hold the sleeve in any position of adjustment.

In Fig. 6, which shows the parts in their operative positions, it will be noted that the shaft sections 30 are extended to engage the gears in the differential casing. In this position, the flanges on the sleeves 29 abut against packing rings 32 on the cages 19 which carry the bearings for the differential assembly.

In assembling the differential mechanism in the axle housing, the differential casing is inserted through the opening 4 and the flange 12 is bolted to the casing, and the supporting ring D is fitted around the rear end of the differential casing and bolted to the axle housing. The differential assembly is thus readily assembled and properly positioned in the axle housing. The drive shafts are then inserted through the ends of the axle housing and into the pinions in the differential assembly. In order to remove the differential casing and assembly entirely from the axle housing, the drive shafts are pulled out endwise of the differential casing, if these are solid shafts, and by unbolting the flange 12, the casing with the differential assembly can be removed as a unit. Where the sectional shafts are used, the differential casing and assembly may be removed, by first taking off the ring D, to permit access to the sleeves 29. By turning these sleeves, the sections 30 of the drive shafts may be telescoped into the main portions of the shafts, as shown in Fig. 11, and when these sections have been moved out of line with the casing, the flange 12 may be unbolted from the axle housing and the casing can be removed, as indicated in Fig. 10. In replacing the casing, these operations are reversed. After the casing has been removed, the differential assembly may be taken out by removing the cap screws 8 and separating the sections 6 and 7 of the casing. Access may be had to the parts in the differential assembly without removing the casing entirely from the housing. Thus, by removing the ring D, access may be had to the sleeve 19, and by turning it the bearings of the differential assembly may be adjusted, if necessary; and as the removal of the ring D exposes the cap screws 8 which hold the two parts of the casing together, these cap screws may be taken out, and this will release the part 7 of the casing which may then be removed through the opening 5 in the rear wall of the axle housing. Fig. 9 shows the casing with the part 7 removed, the gearing being omitted. It will be evident that if the drive shafts are withdrawn from the casing, the differential assembly C, including the sleeves 19, may be taken out through the opening 5 in the rear wall of the axle housing and replaced after inspection or repairs. The part 7 will then be again secured to the part 6 and the shafts returned to their place within the casing, after which the ring D will be secured in its place.

What I claim is:

1. The combination with an axle housing having front and rear openings in its central portion, of a differential casing and a differential assembly enclosed therein, said casing, with the assembly therein, adapted to pass through the front opening of the housing and into the rear opening and having a flange adapted for attachment to the front wall of the housing, and a ring, separate from the casing and housing, encircling the rear end of said casing and detachably secured to the rear wall of the housing, said ring serving as a support for the casing and as a closure for the rear opening in the housing.

2. The combination with an axle housing having front and rear openings in its central portion, of a differential casing adapted to pass through the front opening and into the rear opening in the housing and having a flange for attachment to the front wall of the housing, said casing having bearings in its opposite sides and being separable along the axial line of said bearings, bolts securing the two parts of the casing together and accessible through the rear opening in the housing when said opening is uncovered, and a ring, separate from the casing and housing, detachably secured to the rear wall of the housing and supporting the casing, said ring forming a closure for the rear opening in the housing.

3. The combination with an axle housing, a differential casing removably supported within the housing, and a differential assembly in said casing, of drive shafts in said housing each having a telescopic part movable into and out of said housing.

4. The combination with an axle housing having front and rear openings, of a differential casing movable into and out of said housing through said front opening, drive shafts in said housing each having a telescopic section at its inner end movable into and out of said casing, and means, accessible through said rear opening, for moving said sections.

5. The combination with an axle housing having front and rear openings, of a differential casing movable into and out of said housing through said front opening, drive shafts in said housing each shaft comprising a main section and a shorter telescopic section, and sleeves journaled in said main sections and threaded on to said short sections for moving the latter into and out of the casing, said sleeves being accessible through said rear opening.

In testimony whereof I affix my signature

RICHARD A. WHITTINGHAM.